(12) United States Patent
Chen et al.

(10) Patent No.: US 12,107,214 B2
(45) Date of Patent: Oct. 1, 2024

(54) SOLID ELECTROLYTE MATERIALS AND METHODS OF MAKING THE SAME

(71) Applicant: Georgia Tech Research Corporation, Atlanta, GA (US)

(72) Inventors: Hailong Chen, Atlanta, GA (US); Zhantao Liu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 790 days.

(21) Appl. No.: 17/252,342

(22) PCT Filed: Jun. 14, 2019

(86) PCT No.: PCT/US2019/037207
§ 371 (c)(1),
(2) Date: Dec. 15, 2020

(87) PCT Pub. No.: WO2019/241642
PCT Pub. Date: Dec. 19, 2019

(65) Prior Publication Data
US 2021/0265657 A1    Aug. 26, 2021

Related U.S. Application Data

(60) Provisional application No. 62/685,338, filed on Jun. 15, 2018.

(51) Int. Cl.
*H01M 10/0562* (2010.01)
*C01B 25/14* (2006.01)
(Continued)

(52) U.S. Cl.
CPC ......... *H01M 10/0562* (2013.01); *C01B 25/14* (2013.01); *H01M 10/0525* (2013.01);
(Continued)

(58) Field of Classification Search
CPC ......... H01M 10/0562; H01M 10/0525; H01M 2300/008; C01B 25/14; C01P 2002/72; C01P 2002/77; C01P 2006/40
See application file for complete search history.

(56) References Cited

U.S. PATENT DOCUMENTS

| 4,910,100 A | 3/1990 | Nakanishi et al. |
| 8,697,292 B2 * | 4/2014 | Kanno ................. H01B 1/10 |
| | | 429/321 |

(Continued)

FOREIGN PATENT DOCUMENTS

CN    105594052    * 12/2017

OTHER PUBLICATIONS

Jurgens et al. Solid State Sciences 9 (2007) 213-217 (Year: 2007).*
(Continued)

*Primary Examiner* — Alexander Usyatinsky
(74) *Attorney, Agent, or Firm* — Troutman Pepper Hamilton Sanders LLP; Ryan A. Schneider; Dustin B. Weeks (57) ABSTRACT

A solid electrolyte comprising a compound of the formula $A_y(MS_4)_z(PS_4)_{4-z}X_3$ having an ionic conductivity of from $10^{-7}$ to $10^{-4}$ S/cm at room temperature, and methods of making a solid electrolyte.

14 Claims, 6 Drawing Sheets

(51) Int. Cl.
*C01B 25/18* (2006.01)
*H01M 10/0525* (2010.01)

(52) U.S. Cl.
CPC ...... *C01P 2002/72* (2013.01); *C01P 2002/77* (2013.01); *C01P 2006/40* (2013.01); *H01M 2300/008* (2013.01)

(56) References Cited

U.S. PATENT DOCUMENTS

| | | | | |
|---|---|---|---|---|
| 2009/0117471 | A1* | 5/2009 | Grey | C01G 51/50 |
| | | | | 429/231.95 |
| 2014/0302382 | A1* | 10/2014 | Kambara | H01M 10/0562 |
| | | | | 429/321 |
| 2015/0079485 | A1* | 3/2015 | Choi | B32B 27/40 |
| | | | | 429/403 |
| 2015/0200421 | A1 | 7/2015 | Homma et al. | |
| 2016/0164136 | A1* | 6/2016 | Higuchi | H01M 10/0525 |
| | | | | 429/323 |
| 2017/0162901 | A1* | 6/2017 | Chen | H01M 10/0562 |

OTHER PUBLICATIONS

Lu et al., Inorg. Chem. 2020, 59, 226-234 (Year: 2020).*
Rao et al. Chem. Mater. 2019, 31, 8649-8662 (Year: 2019).*
International Search Report and Written Opinion from Application No. PCT/US2019/037207 dated Oct. 22, 2019 (10 pages).

* cited by examiner

SOLID ELECTROLYTE MATERIALS AND METHODS OF MAKING THE SAME

CROSS-REFERENCE TO RELATED APPLICATIONS

This application claims the benefit of U.S. Provisional Patent Application No. 62/685,338, filed 15 Jun. 2018, the entire contents and substance of which is incorporated herein by reference in its entirety as if fully set forth below.

FIELD OF THE DISCLOSURE

The present disclosure relates generally to electrolytes and methods of making the same. Particularly, embodiments of the present disclosure relate to solid electrolyte materials in electrochemical cells.

BACKGROUND

High-capacity electroactive materials that assure high performance are a prerequisite for ubiquitous adoption of technologies that require high energy/power density lithium-ion batteries, such as smart Internet of Things (IoT) devices and electric vehicles (EVs). Solid-state lithium-ion batteries are considered a promising battery technology for the next generation of electrochemical energy storage. Standard electrochemical cells may utilize a liquid electrolyte to flow ions through the cell to create a voltage. Common commercial lithium-ion batteries (LIBs) contain flammable fluid organic electrolytes to accomplish this, which may cause fire or explosion in harsh or abusive environments. Additionally, the volume required for battery packs using a liquid electrolyte is quite large, making these LIBs bulky, dense, and cumbersome to use. These problems have made LIBs difficult to scale-up and potentially dangerous to the consumer under harsh conditions. Elimination of the need for a flammable liquid electrolyte and a smaller, more lightweight size battery would greatly expand the design space of many industries, such as automotive, electric vehicles, solar power, renewable energy, IoT devices, smart homes, smart devices, green packaging, magnetic devices, sensors, microelectronics, solid-state lighting, consumer electronics, in vivo electronics, aviation, aeronautics, power production, and the like.

What is needed, therefore, is a new electrolyte material that can reduce the size and weight of the electrochemical cell and be safer to use than a standard liquid electrolyte under harsh conditions. Embodiments of the present disclosure address this need as well as other needs that will become apparent upon reading the description below in conjunction with the drawings.

BRIEF SUMMARY OF THE INVENTION

The present invention relates to solid electrolytes and methods of making the same. An exemplary embodiment of the present invention can provide a solid electrolyte, comprising a compound of the formula $A_y(MS_4)_z(PS_4)_{4-z}X_3$, wherein the solid electrolyte presents an ionic conductivity of from $10^{-7}$ to $10^{-3}$ S/cm at room temperature.

In any of the embodiments disclosed herein, the compound may not be $Li_{15}(PS_4)_4Cl_3$.

In any of the embodiments disclosed herein, M can comprise one or more cations.

In any of the embodiments disclosed herein, M can be selected from the group consisting of boron, aluminum, gallium, indium, silicon, germanium, tin, and combinations thereof.

In any of the embodiments disclosed herein, X can be selected from the group consisting of fluorine, chlorine, bromine, iodine, astatine, and combinations thereof.

In any of the embodiments disclosed herein, A can be selected from the group consisting of an alkali metal and an alkaline earth metal.

In any of the embodiments disclosed herein, A can be selected from the group consisting of lithium and sodium.

In any of the embodiments disclosed herein, y can be 1 or greater.

In any of the embodiments disclosed herein, y can be from 1 to 27.

In any of the embodiments disclosed herein, z can be 0 or greater.

In any of the embodiments disclosed herein, z can be less than 4.

Another embodiment of the present disclosure can provide a method of making a solid electrolyte, comprising: providing a starting material, comprising at least compounds of the formulas $A_2S$, $P_2S_5$, MS, $M_2S_3$ or $MS_2$, and AX; mixing the starting material to obtain a solid mixture; and heat-treating the solid mixture in an air-free container at a temperature of from 300 to 500° C. to obtain a solid electrolyte.

In any of the embodiments disclosed herein, the heat-treating can last for 5 hours or greater.

In any of the embodiments disclosed herein, the mixing can further comprise grinding the starting material.

In any of the embodiments disclosed herein, the grinding can comprise mechanical milling.

In any of the embodiments disclosed herein, the mechanical milling can comprise planetary ball milling.

In any of the embodiments disclosed herein, the method can further comprise pressing the solid mixture into pellets prior to the heat-treating.

In any of the embodiments disclosed herein, the method can further comprise grinding the solid electrolyte into a powder.

In any of the embodiments disclosed herein, the method can further comprise doping with a cation M, wherein MS, $M_2S_3$ or $MS_2$ is used in the starting material.

In any of the embodiments disclosed herein, the solid electrolyte can present an ionic conductivity of from $10^{-7}$ to $10^{-3}$ S/cm at room temperature.

In any of the embodiments disclosed herein, the solid electrolyte can comprise a compound of the formula $A_y(MS_4)_z(PS_4)_{4-z}X_3$.

In any of the embodiments disclosed herein, the compound may not be $Li_{15}(PS_4)_4Cl_3$.

In any of the embodiments disclosed herein, M can be selected from the group consisting of boron, aluminum, gallium, indium, silicon, germanium, tin, and combinations thereof.

In any of the embodiments disclosed herein, X can be selected from the group consisting of fluorine, chlorine, bromine, iodine, astatine, and combinations thereof.

In any of the embodiments disclosed herein, A can be selected from the group consisting of an alkali metal and an alkaline earth metal.

In any of the embodiments disclosed herein, A can be selected from the group consisting of lithium and sodium.

In any of the embodiments disclosed herein, y can be 1 or greater.

In any of the embodiments disclosed herein, y can be from 1 to 27.

In any of the embodiments disclosed herein, z can be 0 or greater.

In any of the embodiments disclosed herein, z can be less than 4.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Figure 1:
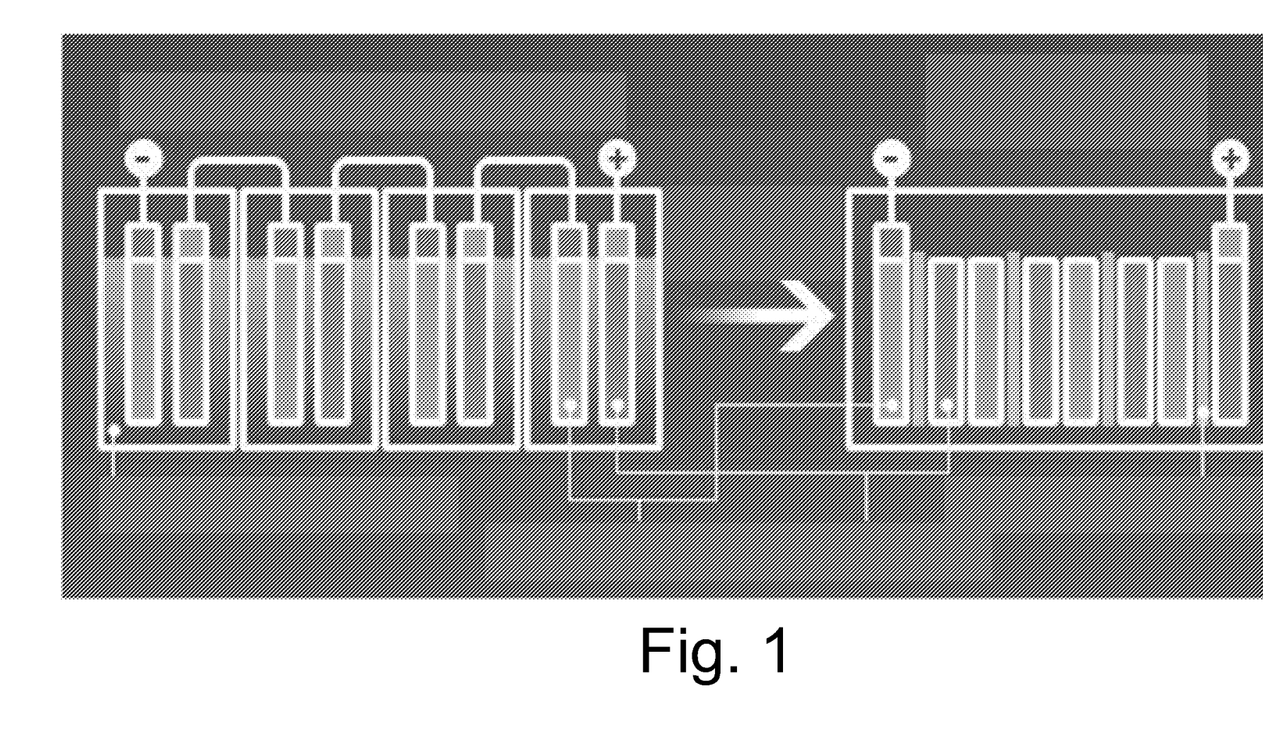
FIG. 1 illustrates an electrochemical cell with a liquid electrolyte compared to an electrochemical cell with a solid electrolyte according to some embodiments of the present disclosure.

As described above, a problem with current electrochemical cells is the large volume and weight required by liquid electrolytes contained within those cells. Mainly, it is desirable to have lightweight and small electrochemical cells to power transportation vehicles and consumer electronics. Additionally, many organic electrolytes used in current electrochemical cells are flammable and unsafe under harsh conditions. Elimination of the need for a dangerous liquid electrolyte and a smaller, more lightweight size battery would greatly expand the design space of many industries, such as automotive, electric vehicles, solar power, renewable energy, IoT devices, smart homes, smart devices, solar cells, green packaging, magnetic devices, sensors, microelectronics, solid-state lighting, consumer electronics, in vivo electronics, aviation, aeronautics, power production, and the like. Compared to commercial electrochemical cells, solid-state electrochemical cells with non-flammable solid electrolytes (SEs) not only have much better safety properties, but also potentially provide higher energy density, if a lithium-metal anode can be enabled. Such an embodiment would provide for safer, lighter, and smaller batteries, an example of which can be seen in FIG. 1.

As the key component of solid-state electrochemical cells, the SE must meet or surpass the performance of standard electrochemical cells in multiple properties, including room temperature (r. t.) ionic conductivity, chemical and electrochemical stability, and mechanical durability. Commonly, SEs with r.t. ionic conductivity of $>10^{-4}$ S/cm are preferred. To date, predominantly two groups of SEs have been investigated: sulfide-based and oxide-based electrolytes. Oxide electrolytes, such as compounds with perovskite, NASICON, or garnet structures, exhibit r.t. ionic conductivity in the range of from $10^{-5}$ to $10^{-3}$ S/cm. However, large grain boundary (GB) resistance was often observed because of poor electrical contact among the particles. High temperature sintering may help to mitigate the GB resistance, which would significantly increase the complexity and cost of the manufacturing process and may result in unwanted side reactions with the cathode materials. In contrast, sulfide SEs are soft and ductile. Good electrical contact among the particles and thus low GB resistance can be relatively easily achieved by facile cold-pressing. A number of lithium sulfides with high r.t. ionic conductivities reaching or even exceeding $10^{-3}$ S/cm have been reported, including $Li_3PS_4$—$Li_4GeS_4$ solid solutions with LISICON structure, $Li_6PS_5X$ (where X is selected from the group consisting of Cl, Br, and I) with argyrodite structure, $Li_7P_3S_1$ glass ceramics, $Li_{10}GeP_2S_{12}$ (LGPS), and the like. Some of these SEs, such as LGPS, exhibit very high r. t. ionic conductivity of $10^{-2}$ S/cm, which is comparable to that of liquid electrolytes, demonstrating the great potential of sulfide SEs. However, most of these known sulfide SEs require sophisticated processing (such as long reaction time, high speed ball-milling, and precise control of starting materials) and high temperature (>500° C.) synthesis to achieve the expected high conductivities.

Figure 2:
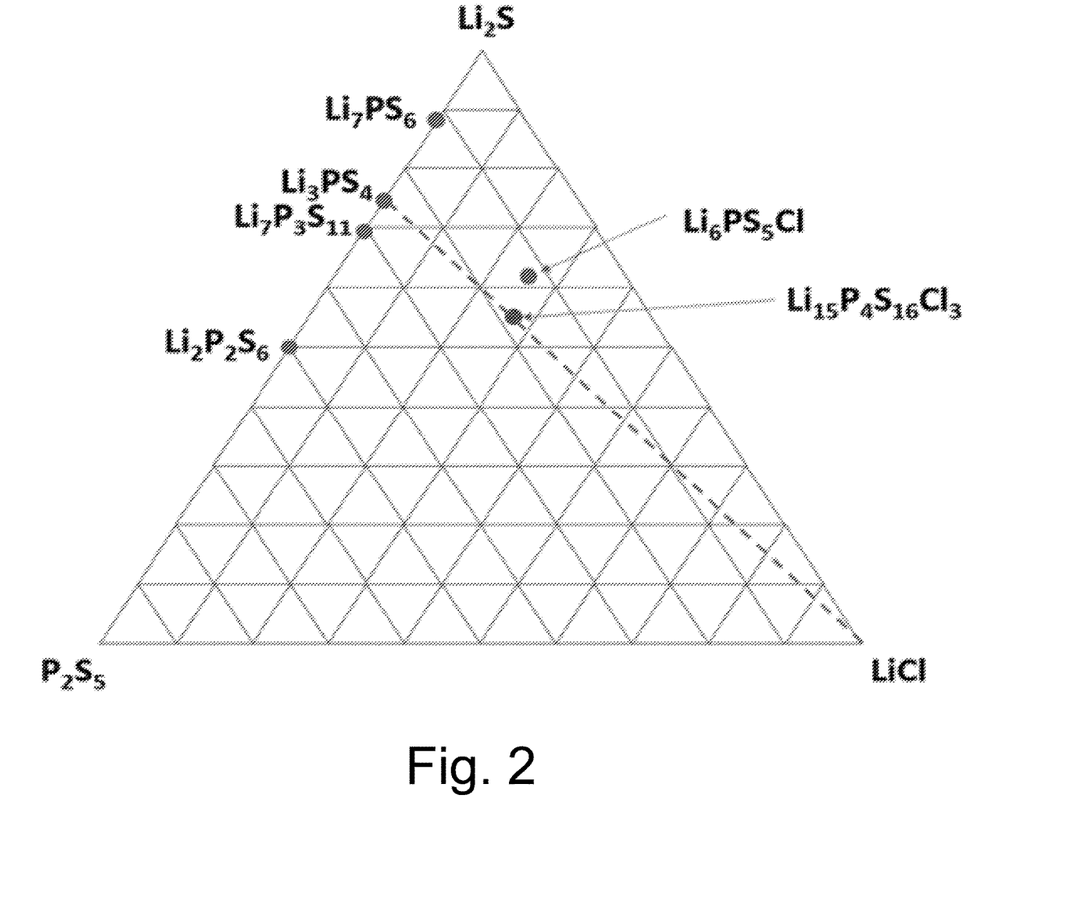
FIG. 2 shows the quaternary Li—P—S—Cl phase diagram plotted in an equivalent ternary phase diagram of $Li_2S$—$P_2S_5$—LiCl.
Figure 3:
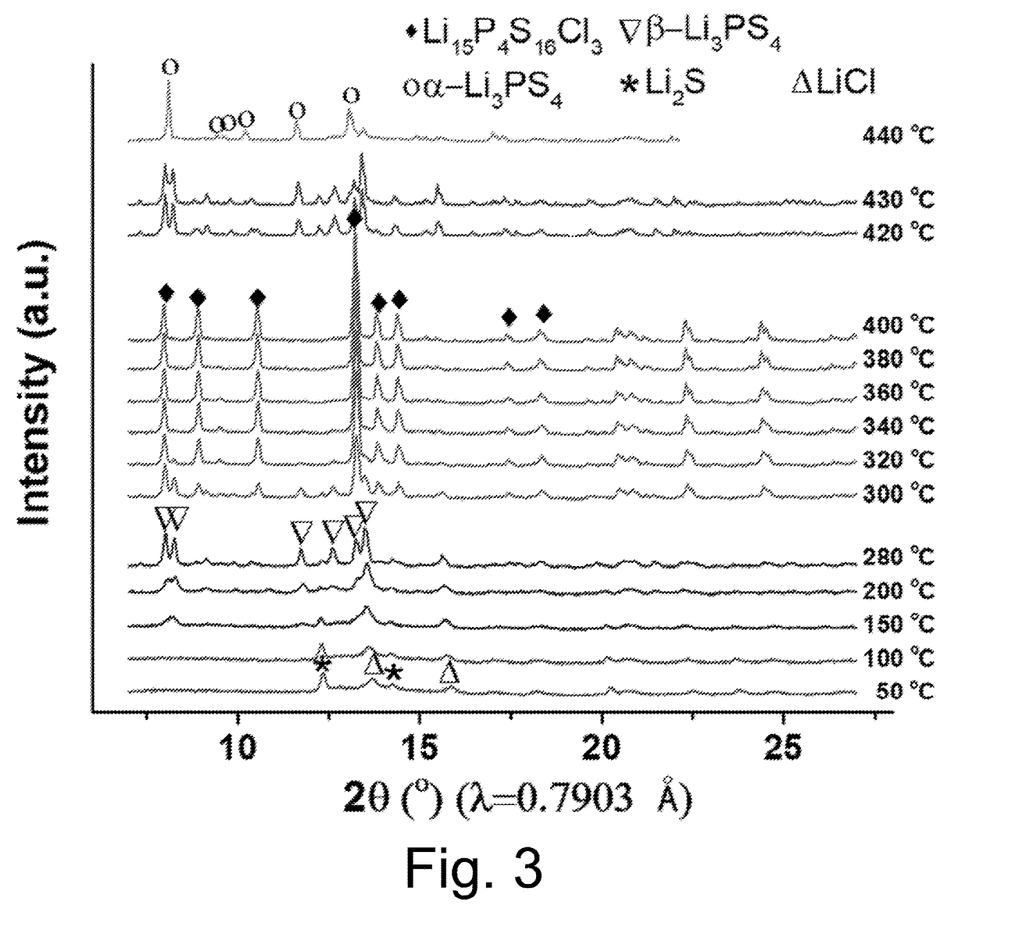
FIG. 3 shows the in-situ x-ray diffraction patterns collected from a set of starting materials for forming a solid electrolyte according to some embodiments of the present disclosure.
Figure 4:
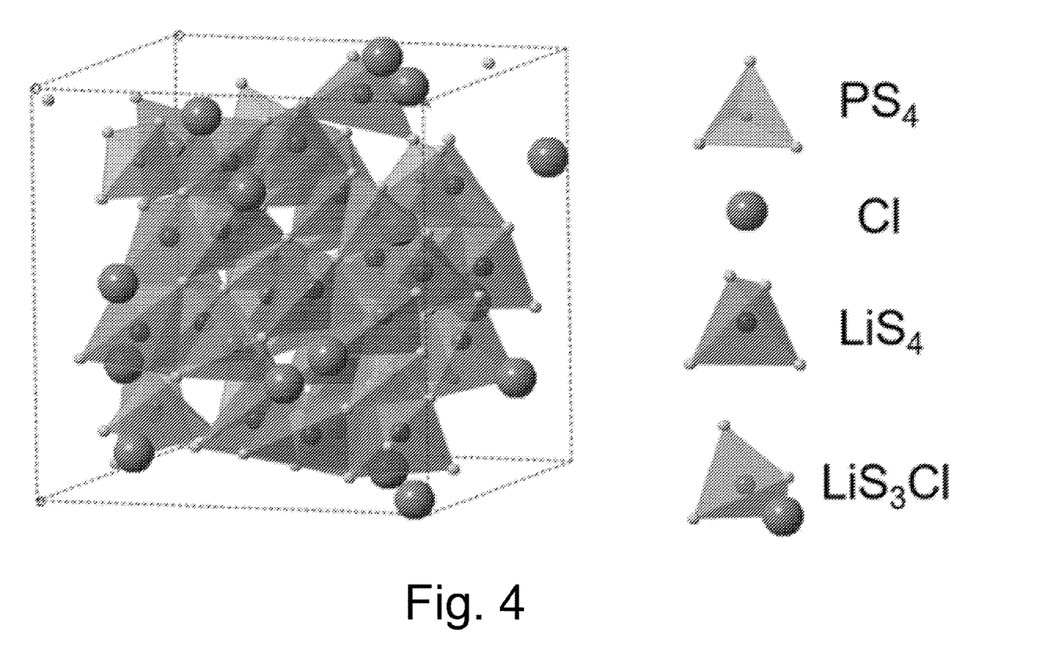
FIG. 4 is a rendering of the crystal structure of a solid electrolyte according to some embodiments of the present disclosure.

SEs with not only high r.t. conductivity, but also facile and low-cost synthesis, are still very much desired. From a crystal structure point of view, all the known sulfide SEs present only a few limited types of crystal structures. Most of the current designs and developments of SEs are focused on elementary modifications based on these known structure types, which can be limited. Addition of a new crystal structure is also desired. Compared with the relatively extensively explored Li—P—S ternary phase diagram, the quaternary phase diagrams of Li—P—S—X (where X is a halogen) is much less explored, which provides a high potential to find new prototypes of lithium-ion conducting crystal structures. Besides the argyrodites $Li_6PS_5X$ (wherein X is Cl, Br, or I), no other Li—P—S—X quaternary compounds have been reported and a large area in the phase diagram remains unexplored. As shown in FIG. 2 for example, the quaternary Li—P—S—Cl phase diagram can be plotted in an equivalent ternary phase diagram of $Li_2S$—$P_2S_5$—LiCl with better clarity. The lithium-rich region on the top right area of the phase diagram was first explored and one new phase was quickly identified. In situ x-ray diffraction (XRD) on the solid-state syntheses of starting materials with various materials ratios were performed. FIG. 3 shows the in situ XRD patterns collected from the starting materials with ratio of, for example, $Li_2S$: $P_2S_5$: LiCl=3:1:1.5. Disclosed herein are embodiments of a new compound with a new crystal structure distinguished from known and commonly-used sulfide SEs. The crystal structure of an exemplary embodiment of the present disclosure is illustrated in FIG. 4.

Disclosed herein, therefore, is a solid electrolyte comprising a compound of the formula $A_y(MS_4)_z(PS_4)_{4-z}X_3$. In some embodiments, the solid electrolyte can present an ionic conductivity of $1.0\times10^{-7}$ S/cm or greater (e.g., $1.5\times10^{-7}$ S/cm or greater, $2.0\times10^{-7}$ S/cm or greater, $3.0\times10^{-7}$ S/cm or greater, $4.0\times10^{-7}$ S/cm or greater, $5.0\times10^{-7}$ S/cm or greater, $6.0\times10^{-7}$ S/cm or greater, $7.0\times10^{-7}$ S/cm or greater, $8.0\times10^{-7}$ S/cm or greater, $9.0\times10^{-7}$ S/cm or greater, $1.0\times10^{-6}$ S/cm or greater, $2.0\times10^{-6}$ S/cm or greater, $3.0\times10^{-6}$ S/cm or greater, $4.0\times10^{-6}$ S/cm or greater, $5.0\times10^{-6}$ S/cm or greater, $6.0\times10^{-6}$ S/cm or greater, $7.0\times10^{-6}$ S/cm or greater, $8.0\times10^{-6}$ S/cm or greater, $9.0\times10^{-6}$ S/cm or greater, $1.0\times10^{-5}$ S/cm or greater, $2.0\times10^{-5}$ S/cm or greater, $3.0\times10^{-5}$ S/cm or greater, $4.0\times10^{-5}$ S/cm or greater, $5.0\times10^{-5}$ S/cm or greater, $6.0\times10^{-5}$ S/cm or greater, $7.0\times10^{-5}$ S/cm or greater, $8.0\times10^{-5}$ S/cm or greater, $9.0\times10^{-5}$ S/cm or greater, $1.0\times10^{-4}$ S/cm or greater, $2.0\times10^{-4}$ S/cm or greater, $3.0\times10^{-4}$ S/cm or greater, $4.0\times10^{-4}$ S/cm or greater, $5.0\times10^{-4}$ S/cm or greater, $6.0\times10^{-4}$ S/cm or greater, $7.0\times10^{-4}$ S/cm or greater, $8.0\times10^{-4}$ S/cm or greater, $9.0\times10^{-4}$ S/cm or greater, or $1.0\times10^{-3}$ S/cm or greater) at room temperature.

In some embodiments, the solid electrolyte can also present an ionic conductivity of $1.0\times10^{-3}$ S/cm or less (e.g., $1.0\times10^{-7}$ S/cm or less, $1.5\times10^{-7}$ S/cm or less, $2.0\times10^{-7}$ S/cm or less, $3.0\times10^{-7}$ S/cm or less, $4.0\times10^{-7}$ S/cm or less, $5.0\times10^{-7}$ S/cm or less, $6.0\times10^{-7}$ S/cm or less, $7.0\times10^{-7}$ S/cm or less, $8.0\times10^{-7}$ S/cm or less, $9.0\times10^{-7}$ S/cm or less, $1.0\times10^{-6}$ S/cm or less, $2.0\times10^{-6}$ S/cm or less, $3.0\times10^{-6}$ S/cm or less, $4.0\times10^{-6}$ S/cm or less, $5.0\times10^{-6}$ S/cm or less, $6.0\times10^{-6}$ S/cm or less, $7.0\times10^{-6}$ S/cm or less, $8.0\times10^{-6}$ S/cm or less, $9.0\times10^{-6}$ S/cm or less, $1.0\times10^{-5}$ S/cm or less, $2.0\times10^{-5}$ S/cm or less, $3.0\times10^{-5}$ S/cm or less, $4.0\times10^{-5}$ S/cm or less, $5.0\times10^{-5}$ S/cm or less, $6.0\times10^{-5}$ S/cm or less, $7.0\times10^{-5}$ S/cm or less, $8.0\times10^{-5}$ S/cm or less, $9.0\times10^{-5}$ S/cm or less, $1.0\times10^{-4}$ S/cm or less, $2.0\times10^{-4}$ S/cm or less, $3.0\times10^{-4}$ S/cm or less, $4.0\times10^{-4}$ S/cm or less, $5.0\times10^{-4}$ S/cm or less, $6.0\times10^{-4}$ S/cm or less, $7.0\times10^{4}$ S/cm or less, $8.0\times10^{-4}$ S/cm or less, or $9.0\times10^{-4}$ S/cm or less) at room temperature.

In some embodiments, the solid electrolyte can present and ionic conductivity of from $1.0\times10^{-7}$ S/cm to $1.0\times10^{-3}$ S/cm (e.g., from $2.0\times10^{-7}$ S/cm to $9.0\times10^{-4}$ S/cm, from $3.0\times10^{-7}$ S/cm to $8.0\times10^{-4}$ S/cm, from $4.0\times10^{-7}$ S/cm to $7.0\times10^{-4}$ S/cm, from $5.0\times10^{-7}$ S/cm to $6.0\times10^{-4}$ S/cm, from $6.0\times10^{-7}$ S/cm to $5.0\times10^{-4}$ S/cm, from $7.0\times10^{-7}$ S/cm to $4.0\times10^{-4}$ S/cm, from $8.0\times10^{-7}$ S/cm to $3.0\times10^{-4}$ S/cm, from $9.0\times10^{-7}$ S/cm to $2.0\times10^{-4}$ S/cm, from $1.0\times10^{-6}$ S/cm to $1.0\times10^{-4}$ S/cm, from $2.0\times10^{-6}$ S/cm to $9.0\times10^{-5}$ S/cm, from $3.0\times10^{-5}$ S/cm to $8.0\times10^{-5}$ S/cm, from $4.0\times10^{-6}$ S/cm to $7.0\times10^{-5}$ S/cm, from $5.0\times10^{-6}$ S/cm to $6.0\times10^{-5}$ S/cm, from $6.0\times10^{-6}$ S/cm to $5.0\times10^{-5}$ S/cm, from $7.0\times10^{-6}$ S/cm to $4.0\times10^{-5}$ S/cm, from $8.0\times10^{-6}$ S/cm to $3.0\times10^{-5}$ S/cm, or from $9.0\times10^{-6}$ S/cm to $2.0\times10^{-5}$ S/cm) at room temperature.

In some embodiments, M can be one or more cations (e.g., two or more, three or more, four or more, five or more, six or more, seven or more, eight or more, nine or more, or ten or more). In some embodiments, M can be an element selected from the group consisting of post-transition metals and metalloids. Suitable examples of a cation M can include, but are not limited to, boron, aluminum, silicon, gallium, germanium, arsenic, indium, tin, antimony, tellurium, thallium, lead, bismuth, polonium, or combinations thereof. For instance, M can comprise silicon such that the solid electrolyte presents a formula of $A_y(SiS_4)_z(PS_4)_{4-z}X_3$. By way of another example wherein M is more than one cation, M can comprise gallium and germanium. Such an embodiment would create a mixture of two formulas, such as a mixture of $A_y(GeS_4)_z(PS_4)_{4-z}X_3$ and $A_y(GaS_4)_z(PS_4)_{4-z}X_3$.

In some embodiments, X can be one or more anions (e.g., two or more, three or more, four or more, five or more, six or more, seven or more, eight or more, nine or more, or ten or more). In some embodiments, X can be an element selected from the group consisting of elemental halogens and combinations thereof. Suitable examples of an anion X can include, but are not limited to, fluorine, chlorine, bromine, iodine, astatine, and combinations thereof. For instance, X can comprise chlorine such that the solid electrolyte presents a formula of $A_y(MS_4)_z(PS_4)_{4-z}Cl_3$. In other embodiments, X can be more than one cation. Such embodiments, for example, could create a mixture of two formulas, such as a mixture of $A_y(MS_4)_z(PS_4)_{4-z}Br_3$ and $A_y(MS_4)_z(PS_4)_{4-z}Cl_3$.

In some embodiments, A can be one or more cations (e.g., two or more, three or more, four or more, five or more, six or more, seven or more, eight or more, nine or more, or ten or more). In some embodiments, A can be an element selected from the group consisting of alkali metals, alkaline earth metals, and combinations thereof. Alternatively, and additionally, A can be selected from the group consisting of transition metals and combinations thereof. Suitable examples a cation A can include, but are not limited to, lithium, sodium, potassium, rubidium, cesium, francium, beryllium, magnesium, calcium, strontium, barium, radium, silver, gold, titanium, combinations thereof, and the like. For instance, A can comprise lithium such that the solid electrolyte presents a formula of $Li_y(MS_4)_z(PS_4)_{4-z}X_3$. In other embodiments, A can be more than one anion. Such embodiments, for example, could create a mixture of two formulas, such as a mixture of $Li_y(MS_4)_z(PS_4)_{4-z}X_3$ and $Na_y(MS_4)_z(PS_4)_{4-z}X_3$.

In some embodiments, y can be any rational number. For example, y can be 3/2, 5/2, 7/3, 11/5, 1/2, 4/5, and the like. In some embodiments, for example, y can be 1 or greater (e.g., 2 or greater, 3 or greater, 4 or greater, 5 or greater, 6 or greater, 7 or greater, 8 or greater, 9 or greater, 10 or greater, 11 or greater, 12 or greater, 13 or greater, 14 or greater, 15 or greater, 16 or greater, 17 or greater, 18 or greater, 19 or greater, 20 or greater, 21 or greater, 22 or greater, 23 or greater, 24 or greater, 25 or greater, 26 or greater, or 27 or greater). In some embodiments y can be 27 or less (e.g., 1 or less, 2 or less, 3 or less, 4 or less, 5 or less, 6 or less, 7 or less, 8 or less, 9 or less, 10 or less, 11 or less, 12 or less, 13 or less, 14 or less, 15 or less, 16 or less, 17 or less, 18 or less, 19 or less, 20 or less, 21 or less, 22 or less, 23 or less, 24 or less, 25 or less, or 26 or less). In some embodiments, y can be from 1 to 27 (e.g., from 2 to 26, from 3 to 25, from 4 to 24, from 5 to 23, from 6 to 22, from 7 to 21, from 8 to 20, from 9 to 19, from 10 to 18, from 11 to 17, from 12 to 16, or from 13 to 15).

In some embodiments, z can be any rational number. For example, z can be 1/2, 1/3, 5/3, 7/4, and the like. In some embodiments, for example, z can be 0 or greater (e.g., 1/3 or greater, 1/2 or greater, 2/3 or greater, 1 or greater, 4/3 or greater, 3/2 or greater, 5/3 or greater, 2 or greater, 7/3 or greater, 5/2 or greater, 8/3 or greater, 3 or greater, 10/3 or greater, 7/2 or greater, 11/3 or greater, or 4 or greater). In some embodiments, z can be 4 or less (e.g., 1/3 or less, 1/2 or less, 2/3 or less, 1 or less, 4/3 or less, 3/2 or less, 5/3 or less, 2 or less, 7/3 or less, 5/2 or less, 8/3 or less, 3 or less, 10/3 or less, 7/2 or less, or 11/3 or less). In some embodiments, z can be from 0 to 4 (e.g., from 1/3 to 11/3, from 1/2 to 7/2, from 2/3 to 10/3, from 1 to 3, from 4/3 to 8/3, from 3/2 to 5/2, or from 5/3 to 7/3).

By way of illustration and not limitation, certain examples of the aforementioned embodiments of the disclosed solid electrolyte can include, but are not limited to, $Li_{16}(SiS_4)(PS_4)_3Cl_3$, $Na_{16}(GeS_4)(PS_4)_3Br_3$, $Li_{19}(GaS_4)_2(PS_4)_2Cl_3$, $Li_{16}(GeS_4)(PS_4)_3Cl_3$, and combinations thereof. Additionally, in some embodiments, the solid electrolyte may not have the formula of $Li_{15}(PS_4)_4Cl_3$.

Also disclosed herein are electrodes and electrochemical cells comprising a solid electrolyte of the present disclosure. Embodiments of the present disclosure can provide for a solid-state cell, comprising an anode, a cathode, and a solid electrolyte disposed between the anode and the cathode. The solid electrolyte may be a solid electrolyte according to embodiments of the present disclosure. In some embodiments, the solid-state cell may be capable of flowing ions between the anode and the cathode through the solid electrolyte. Embodiments of the present disclosure can provide a solid-state battery comprising one or more solid-state cells. In some embodiments, the solid-state battery can comprise a number of solid-state cells capable of producing a desired voltage. Also contemplated herein are methods of making a solid-state cell and a solid-state battery comprising a solid electrolyte of the present disclosure.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 5:
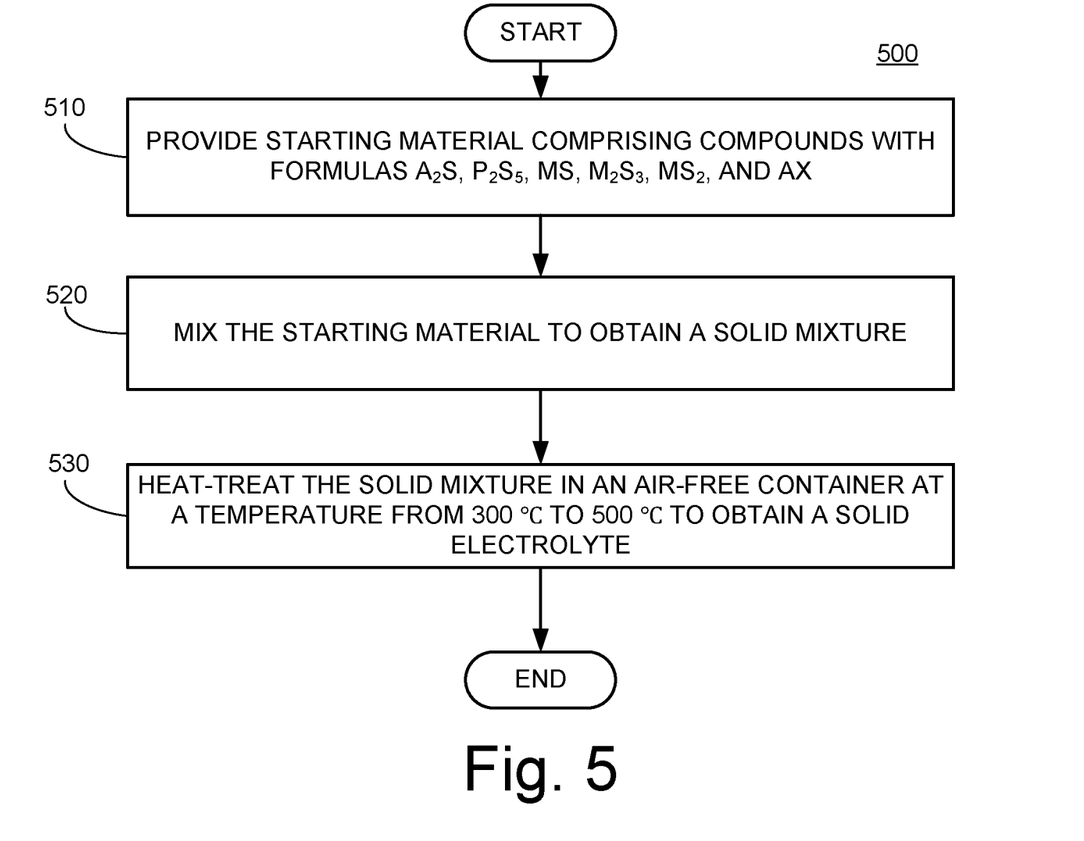
FIG. 5 is a flowchart of a method for making a solid electrolyte according to some embodiments of the present disclosure.
Figure 6:
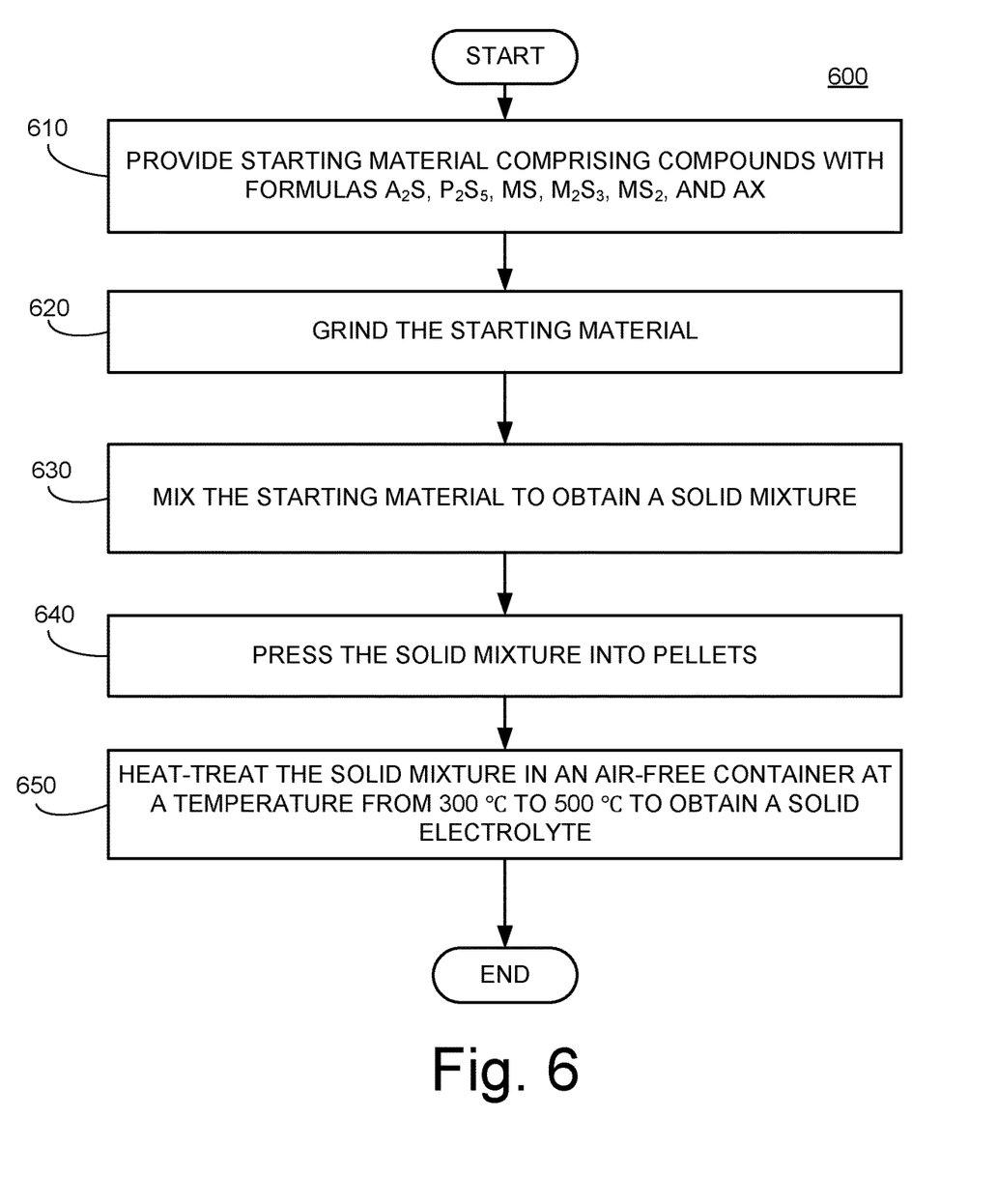
FIG. 6 is a flowchart of a method for making a solid electrolyte according to some embodiments of the present disclosure.

FIGS. 5-6 illustrate exemplary embodiments of the presently disclosed method of making a homogeneously distributed solvent.

In FIG. 5, in block 510, a starting material can be provided comprising compounds with at least one of the formulas $A_2S$, $P_2S_5$, $MS$, $M_2S_3$ or $MS_2$, and AX, wherein A, M, and X are as described above. The formulas can be selected from above based on the desired final formula and the commercial availability of the starting material.

In block 520, the starting material can be mixed to obtain a solid mixture. A variety of physical mixing methods are suitable for use in the present invention, including high shear mixing, such as with a high-speed mixer, homogenizers, microfluidizers, high impact mixing, Morehouse mills, Buxton knife mills, Gaulin homogenizers, colloid mills, rotating knife-edge mills, rotor-stator mills, and three-roll mills, mechanical mills, planetary ball mills, and ultrasonication methods. It is understood that, in some embodiments, the solid mixture can comprise other species, such as inhibitors, catalysts, nonsolvents, and the like.

In block 530, the solid mixture can then be heat-treated to obtain a solid electrolyte. In some embodiments, the heat-treating can occur in an air-free container. For instance, the heat-treating can occur under vacuum or under an inert atmosphere, such as nitrogen or argon. In some embodiments, the heat-treating can occur at a temperature of 300° C. or greater (e.g., 310° C. or greater, 320° C. or greater, 330° C. or greater, 340° C. or greater, 350° C. or greater, 360° C. or greater, 370° C. or greater, 380° C. or greater, 390° C. or greater, 400° C. or greater, 410° C. or greater, 420° C. or greater, 430° C. or greater, 440° C. or greater, 450° C. or greater, 460° C. or greater, 470° C. or greater, 480° C. or greater, 490° C. or greater, or 500° C. or greater). In some embodiments, the heat-treating can occur at a temperature of 500° C. or less (e.g., 300° C. or less, 310° C. or less, 320° C. or less, 330° C. or less, 340° C. or less, 350° C. or less, 360° C. or less, 370° C. or less, 380° C. or less, 390° C. or less, 400° C. or less, 410° C. or less, 420° C. or less, 430° C. or less, 440° C. or less, 450° C. or less, 460° C. or less, 470° C. or less, 480° C. or less, or 490° C. or less). In some embodiments, the heat-treating can occur at a temperature of from 300° C. to 500° C. (e.g., from 310° C. to 490° C., from 320° C. to 480° C., from 330° C. to 470° C., from 340° C. to 460° C., from 350° C. to 450° C., from 360° C. to 440° C., from 370° C. to 430° C., from 380° C. to 420° C., or from 390° C. to 410° C.).

In some embodiments, the heat-treating can last for 5 hours or greater (e.g., 6 hours or greater, 7 hours or greater, 8 hours or greater, 9 hours or greater, 10 hours or greater, 11 hours or greater, 12 hours or greater, 13 hours or greater, 14 hours or greater, 15 hours or greater, 16 hours or greater, 17 hours or greater, 18 hours or greater, 19 hours or greater, 20 hours or greater, 21 hours or greater, 22 hours or greater, 23 hours or greater, or 24 hours or greater). In some embodiments, the heat-treating can last for 24 hours or less (e.g., 5 hours or less, 6 hours or less, 7 hours or less, 8 hours or less, 9 hours or less, 10 hours or less, 11 hours or less, 12 hours or less, 13 hours or less, 14 hours or less, 15 hours or less, 16 hours or less, 17 hours or less, 18 hours or less, 19 hours or less, 20 hours or less, 21 hours or less, 22 hours or less, or 23 hours or less). In some embodiments, the heat-treating can occur for from 5 to 24 hours (e.g., from 6 to 23 hours, from 7 to 22 hours, from 8 to 21 hours, from 9 to 20 hours, from 10 to 19 hours, from 11 to 18 hours, from 12 to 17 hours, from 13 to 16 hours, or from 14 to 15 hours). In some embodiments, for use, the solid electrolyte can then be further ground into a powder.

It is understood that prior to using the solid electrolyte, the solid electrolyte may, in some embodiments, be doped with cations to further tune the ionic conductivity of the solid electrolyte. For instance, as in the compounds mentioned above, a solid electrolyte may be doped with a cation M in situations where MS, $M_2S_3$ or $MS_2$ is used in the starting material to tune ionic conductivity.

In FIG. 6, in block 610, a starting material can be provided comprising compounds with the formulas $A_2S$, $P_2S_5$, MS, $M_2S_3$ or $MS_2$, and AX, wherein A, M, and X are as described above. The formulas can be selected from above based on the desired final formula and the commercial availability of the starting material.

In block 620, and similarly block 630, the starting material can be ground and mixed to obtain a solid mixture. A variety of physical mixing methods are suitable for use in the present invention, including high shear mixing, such as with a high-speed mixer, homogenizers, microfluidizers, high impact mixing, Morehouse mills, Buxton knife mills, Gaulin homogenizers, colloid mills, rotating knife-edge mills, rotor-stator mills, and three-roll mills, mechanical mills, planetary ball mills, and ultrasonication methods. It is understood that, in some embodiments, the solid mixture can comprise other species, such as inhibitors, catalysts, nonsolvents, and the like.

In block 640, the solid mixture can be pressed into pellets.

In block 650, the pellets can then be heat-treated to obtain a solid electrolyte. In some embodiments, the heat-treating can occur in an air-free container. For instance, the heat-treating can occur under vacuum or under an inert atmosphere, such as nitrogen or argon. In some embodiments, the heat-treating can occur at a temperature of 300° C. or greater (e.g., 310° C. or greater, 320° C. or greater, 330° C. or greater, 340° C. or greater, 350° C. or greater, 360° C. or greater, 370° C. or greater, 380° C. or greater, 390° C. or greater, 400° C. or greater, 410° C. or greater, 420° C. or greater, 430° C. or greater, 440° C. or greater, 450° C. or greater, 460° C. or greater, 470° C. or greater, 480° C. or greater, 490° C. or greater, or 500° C. or greater). In some embodiments, the heat-treating can occur at a temperature of 500° C. or less (e.g., 300° C. or less, 310° C. or less, 320° C. or less, 330° C. or less, 340° C. or less, 350° C. or less, 360° C. or less, 370° C. or less, 380° C. or less, 390° C. or less, 400° C. or less, 410° C. or less, 420° C. or less, 430° C. or less, 440° C. or less, 450° C. or less, 460° C. or less, 470° C. or less, 480° C. or less, or 490° C. or less). In some embodiments, the heat-treating can occur at a temperature of from 300° C. to 500° C. (e.g., from 310° C. to 490° C., from 320° C. to 480° C., from 330° C. to 470° C., from 340° C. to 460° C., from 350° C. to 450° C., from 360° C. to 440° C., from 370° C. to 430° C., from 380° C. to 420° C., or from 390° C. to 410° C.).

In some embodiments, the heat-treating can last for 5 hours or greater (e.g., 6 hours or greater, 7 hours or greater, 8 hours or greater, 9 hours or greater, 10 hours or greater, 11 hours or greater, 12 hours or greater, 13 hours or greater, 14 hours or greater, 15 hours or greater, 16 hours or greater, 17 hours or greater, 18 hours or greater, 19 hours or greater, 20 hours or greater, 21 hours or greater, 22 hours or greater, 23 hours or greater, or 24 hours or greater). In some embodiments, the heat-treating can last for 24 hours or less (e.g., 5 hours or less, 6 hours or less, 7 hours or less, 8 hours or less, 9 hours or less, 10 hours or less, 11 hours or less, 12 hours or less, 13 hours or less, 14 hours or less, 15 hours or less, 16 hours or less, 17 hours or less, 18 hours or less, 19 hours or less, 20 hours or less, 21 hours or less, 22 hours or less, or 23 hours or less). In some embodiments, the heat-treating can occur for from 5 to 24 hours (e.g., from 6 to 23 hours, from 7 to 22 hours, from 8 to 21 hours, from 9 to 20 hours, from 10 to 19 hours, from 11 to 18 hours, from 12 to 17 hours, from 13 to 16 hours, or from 14 to 15 hours). In some embodiments, for use, the solid electrolyte can then be further ground into a powder.

It is understood that prior to using the solid electrolyte, the solid electrolyte may, in some embodiments, be doped with cations to further tune the ionic conductivity of the solid electrolyte. For instance, as in the compounds mentioned above, a solid electrolyte may be doped with a cation M in situations where MS, $M_2S_3$ or $MS_2$ is used in the starting material to tune ionic conductivity.

Reference will now be made in detail to exemplary embodiments of the disclosed technology, examples of which are illustrated in the accompanying drawings and disclosed herein.

EXAMPLES

The following examples are provided by way of illustration but not by way of limitation.

Example 1

Materials and Methods $Li_{15}P_4S_{16}Cl_3$ was synthesized by mechanical milling and subsequent heat treatment. The starting materials $Li_2S$ (99.98%, Sigma-Aldrich), $P_2S_5$ (99%, Sigma-Aldrich) and LiCl (>99%, Sigma-Aldrich) were weighed in desired molar ratio and mixed in a high energy planetary ball mill (PM 200, Retsch) with using a zirconia jar with 10 zirconia balls of 10 mm diameter. The rotation speed was 370 rpm and the milling time was 20 hours. The ball-milled mixture was then pressed into pellets with a diameter of ½ inch and sealed in a quartz tube. The pellets were heated at 360° C. for 20 h and cooled down inside the furnace. The pellets were ground into powder and kept in an Ar-filled glove box.

The X-ray diffraction (XRD) data of the powder samples was first collected by using a D8 Advance X-ray Diffractometer (Bruker AXS) with molybdenum radiation ($\lambda K\alpha 1$=0.7093 Å). In situ XRD data of the synthesis process was also collected with using a heat chamber (HTK1200N, Anton Paar) mounted on the diffractometer as follows. The powder of ball-milled mixture of starting materials was filled in quartz capillary in the glove box and sealed. The tube was heated in the chamber from room temperature to 440° C. with a step size of 20° C. XRD data were collected in each step while the temperature was kept constant during the XRD scan.

Synchrotron XRD and pair distribution function (PDF) data were collected at beam line 17-BM-B at the Advanced Photon Source (APS) at Argonne National Laboratory (ANL), with a wavelength of 0.24116 Å. High quality powder neutron diffraction (ND) data were collected on the time-of-flight diffractometer POWGEN at the Spallation Neutron Source (SNS) at Oak Ridge National Laboratory (ORNL) using the frame with a center wavelength of 0.8 Å. The crystal structure model obtained from the Rietveld refinement was used as the starting model for PDF data analysis.

Ionic conductivity of the samples was measured with an electrochemical impedance analyzer (VMP3, Bio-Logic) and a custom-built electrochemical cell. Typically, ~130 mg $Li_{15}P_4S_{16}Cl_3$ powder was pressed into a pellet with a diameter of ½ inch at a pressure of 100 bars. Two stainless steel rods were used as the current collectors. Electrochemical impedance spectra were acquired in the temperature range of 30° C. to 90° C. at frequencies between 1 MHz and 1 Hz and with AC amplitude of 500 mV.

Example 2

Materials and Methods $Li_{15.5}Ge_{0.5}P_{3.5}S_{15}Cl_3$ was synthesized by mechanical milling and subsequent heat treatment. The starting materials $Li_2S$ (99.98%, Sigma-Aldrich), $P_2S_5$ (99%, Sigma-Aldrich), $GeS_2$ (>99%, Sigma-Aldrich), and LiCl (>99%, Sigma-Aldrich) were weighed in desired molar ratio and mixed in a high energy planetary ball mill (PM 200, Retsch) with using a zirconia jar with 10 zirconia balls of 10 mm diameter. The rotation speed was 370 rpm and the milling time was 20 hours. The ball-milled mixture was then pressed into pellets with a diameter of ½ inch and sealed in a quartz tube. The pellets were heated at 360° C. for 20 h and cooled down inside the furnace. The pellets were ground into powder and kept in an Ar-filled glove box.

The X-ray diffraction (XRD) data of the powder samples was first collected by using a D8 Advance X-ray Diffractometer (Bruker AXS) with molybdenum radiation ($\lambda K\alpha1=0.7093$ Å). In situ XRD data of the synthesis process was also collected with using a heat chamber (HTK1200N, Anton Paar) mounted on the diffractometer as follows. The powder of ball-milled mixture of starting materials was filled in quartz capillary in the glove box and sealed. The tube was heated in the chamber from room temperature to 440° C. with a step size of 20° C. XRD data were collected in each step while the temperature was kept constant during the XRD scan.

Synchrotron XRD and pair distribution function (PDF) data were collected at beam line 17-BM-B at the Advanced Photon Source (APS) at Argonne National Laboratory (ANL), with a wavelength of 0.24116 Å. High quality powder neutron diffraction (ND) data were collected on the time-of-flight diffractometer POWGEN at the Spallation Neutron Source (SNS) at Oak Ridge National Laboratory (ORNL) using the frame with a center wavelength of 0.8 Å. The crystal structure model obtained from the Rietveld refinement was used as the starting model for PDF data analysis.

Ionic conductivity of the samples was measured with an electrochemical impedance analyzer (VMP3, Bio-Logic) and a custom-built electrochemical cell. Typically, ~130 mg $Li_{15.5}Ge_{0.5}P_{3.5}S_{15}Cl_3$ powder was pressed into a pellet with a diameter of ½ inch at a pressure of 100 bars. Two stainless steel rods were used as the current collectors. Electrochemical impedance spectra were acquired in the temperature range of 30° C. to 90° C. at frequencies between 1 MHz and 1 Hz and with AC amplitude of 500 mV.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the various patent offices and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A solid electrolyte comprising a compound of the formula $A_y(MS_4)_z(PS_4)_{4-z}X_3$ that presents an ionic conductivity of from $10^{-7}$ to $10^{-4}$ S/cm at room temperature;
   wherein:
   A is selected from the group consisting of lithium and sodium;
   M is selected from the group consisting of boron, aluminum, gallium, indium, silicon, germanium, tin, and combinations thereof;
   X is selected from the group consisting of fluorine, chlorine, bromine, iodine, and combinations thereof;
   the compound is not $Li_{15}(PS_4)_4Cl_3$;
   y is from 1 to 27; and
   z is from 0 to less than 4.

2. An electrochemical cell comprising:
   the solid electrolyte of claim 1.

3. An electrochemical cell comprising:
an anode;
a cathode; and
the solid electrolyte of claim 1 disposed between the anode and the cathode.

4. A solid-state cell comprising:
the solid electrolyte of claim 1.

5. A solid-state battery comprising:
one or more solid-state cells;
wherein each solid-state cell comprises:
- an anode;
- a cathode; and
- the solid electrolyte of claim 1 disposed between the anode and the cathode.

6. The solid electrolyte of claim 1, wherein y is a rational number; and
wherein z is a rational number.

7. A method of making the solid electrolyte of claim 1 comprising:
mixing a starting material comprising:
- first set of compounds of the formulas $A_2S$, $P_2S_5$, and AX; and
- at least one compound selected from a second set of compounds of the formulas MS, $M_2S_3$, $MS_2$, and combinations thereof;

to obtain a solid mixture; and
heat-treating the solid mixture in an air-free container at a temperature of from 300 to 500° C. to obtain the solid electrolyte of claim 1.

8. The method of claim 7, wherein the heat-treating lasts for 5 hours or greater.

9. The method of claim 7 further comprising grinding the starting material.

10. The method of claim 9, wherein the grinding comprises mechanical milling.

11. The method of claim 10, wherein the mechanical milling comprises planetary ball milling.

12. The method of claim 7 further comprising pressing the solid mixture into pellets prior to the heat-treating.

13. The method of claim 7 further comprising grinding the solid electrolyte into a powder.

14. A solid electrolyte selected from the group consisting of $Li_{15}P_4S_{16}Cl_3$, $Li_{15.5}Ge_{0.5}P_{3.5}S_{15}Cl_3$, $Li_{16}(SiS_4)(PS_4)_3Cl_3$, $Na_{16}(GeS_4)(PS_4)_3Br_3$, $Li_{19}(GaS_4)_2(PS_4)_2Cl_3$, $Li_{16}(GeS_4)(PS_4)_3Cl_3$, and combinations thereof;
wherein the solid electrolyte presents an ionic conductivity of from $10^{-7}$ to $10^{-4}$ S/cm at room temperature.

* * * * *